US 6,721,311 B1

(12) United States Patent
Samsudin et al.

(10) Patent No.: US 6,721,311 B1
(45) Date of Patent: Apr. 13, 2004

(54) SELF-ROUTING PERMUTATION NETWORKS BASED ON DE BRUIJN DIGRAPHS

(75) Inventors: Azman Samsudin, Penang (MY); Kyungsook Y. Lee, Englewood, CO (US)

(73) Assignee: Colorado Seminary, Denver, CO (US)

( * ) Notice: Subject to any disclaimer, the term of this patent is extended or adjusted under 35 U.S.C. 154(b) by 785 days.

(21) Appl. No.: 09/631,206

(22) Filed: Aug. 1, 2000

Related U.S. Application Data
(60) Provisional application No. 60/148,110, filed on Aug. 10, 1999.

(51) Int. Cl.[7] ............................................. H04L 12/50
(52) U.S. Cl. ....................................... 370/369; 370/380
(58) Field of Search .............................. 370/369, 380, 370/387, 388

(56) References Cited

U.S. PATENT DOCUMENTS

| | | |
|---|---|---|
| 4,495,615 A | 1/1985 | Wilcke |
| 5,134,690 A | 7/1992 | Samatham |
| 5,218,676 A | 6/1993 | Ben-Ayed et al. |
| 5,491,705 A | 2/1996 | Pradhan et al. |
| 6,018,523 A | 1/2000 | Even |

OTHER PUBLICATIONS

Samsudin and Lee, nD–dBPN: New Self–Routing Permutation Networks Based On the de Bruijn Digraphs, Thesis, Aug. 27, 1998, 8 pages.

Clos, A Study of Non–Blocking Switching Networks, The Bell System Technical Journal, vol. XXXII, Mar. 1953, pp. 126–144.

Goke and Lipovski, Banvan Networks for Partitioning Multiprocessor Systems, The Proceedings of the First Annual Symposium on Computer Architecture, 1973, pp. 100–107.

Benes, Permutation Groups, Complexes, and Rearrangeable Connecting Networks, Bell System Technical Journal, 43, No. 4, 1964, pp. 1619–1640.

Sivarajan and Ramaswami, Multiphop Lightwave Networks Based on de Bruijn Graphs, IBM Research Division, 1991, pp. 1001–1011.

Banerjee, Jain, Shah, Regular Multihop Logical Topologies for Lightwave Networks, IEEE, 1999, http://www.comsoc.org/pubs/surveys/1q99issue/banerjee.html, (24 pages).

*Primary Examiner*—Douglas Olms
*Assistant Examiner*—Robert W. Wilson
(74) *Attorney, Agent, or Firm*—Dorr, Carson, Sloan, Birney & Kramer, P.C.

(57) ABSTRACT

Permutation networks based on de Bruijn digraphs exhibit constant control complexity (wide sense non-blocking) and constant control complexity (self-routing). The cost in terms of the cross-points used for such networks is an optimal O(N log N). This non-blocking network uses fast algorithms to control in the Terabit bandwidth while providing for cost-effective switching. The network has expandable (i.e., scalable) architecture, i.e., the network can be built by interconnecting smaller non-blocking networks (e.g., small crossbars).

19 Claims, 8 Drawing Sheets

SELF-ROUTING PERMUTATION NETWORKS BASED ON DE BRUIJN DIGRAPHS

RELATED APPLICATION

This application claims priority to Provisional Patent Application, Ser. No. 60/148,110 filed Aug. 10, 1999, entitled "SELF-ROUTING PERMUTATION NETWORKS BASED ON DE BRUIJN DIGRAPHS."

BACKGROUND OF THE INVENTION

1. Field of the Invention

The field of invention relates to self-routing permutation networks that are scalable and exhibit optimal control and cross-point complexity.

2. Statement of the Problem

In switching networks, inputs and outputs are connected via paths. Different connections utilize different paths. Early switching networks used in telephone switching systems were space-division switching networks where inputs and outputs were connected by physical paths via arrays of relays which acted as cross-points. Switching networks have since greatly evolved, both physically and also in their context. Currently, efficient and low cost switching networks are crucial not only for telecommunication networks, but also for parallel computing where processors and memory modules are connected via fast and efficient switching networks.

With the advance in digital optics, much work on photonic switching architectures have taken place. There are many benefits that can be derived from the use of optics in switching networks. In particular, optical switching networks can provide higher bandwidths, faster connections, and large numbers of connections per optical link (via wavelength division multiplexing—WDM). Optical switching networks also utilize less power than their electronic counterparts. In addition, optical signals are not subject to noise that can corrupt high-frequency signals, allowing optical signals to be more densely packed.

Switching networks can be divided into two groups: fully connected non-blocking networks, and fully connected but blocking networks. Non-blocking switching networks can be further classified into three categories: rearrangeable non-blocking networks, wide-sense non-blocking networks, and strictly non-blocking networks.

A network is classified as rearrangeable if any idle input may be connected to any idle output provided that existing connections are allowed to be rearranged. A strictly non-blocking network on the other hand is always able to connect any idle input to any idle output without interfering with the existing connections. Wide-sense non-blocking network achieves strictly non-blocking property with the help of an algorithm.

In parallel computing, non-blocking networks (also known as permutation networks) can provide the right balance between the processing power of the processing units and the communication bandwidth between them. Collisions are practically non-existent if parallel algorithms are crafted such that data with distinct outputs are produced from the inputs on every cycle. Processing units that are connected to this non-blocking network can be connected quickly to any other processing units in exactly one-network hop, regardless of the physical topology that the processing units (or group of processing units) are emulating.

Crossbar switches, Clos networks and Benes networks are well-known permutation networks. See C. Clos, "A Study of Non-blocking Switching Networks," *Bell System Technical Journal*, 32, pp. 406–424, 1953 and V. E. Benes, "Permutation Groups, Complexes, and Rearrangeable Multistage Connecting Networks," *Bell System Technical Journal*, 43, pp. 1619–1640, 1964. The (N×N) crossbar switches have $N^2$ cross-points and a constant control complexity. The (N×N) 3-stage Clos network has the $O(N^{3/2})$ cross-point and control complexities. The Benes network, based on (d×d) crossbar switches, has the $O(N \log_d N)$ cross-point and control complexities.

In telecommunications, Broadband Integrated Services Digital Network (B-ISDN), based on Asynchronous Transfer Mode (ATM), is expected to be the fabric of future communication networks. For building large ATM switches, non-blocking Clos network is one of the most popular general architecture used. One of the main reasons that contributes to its popularity is its expandable architecture. A large Clos network can be built by interconnecting small switching modules in a regular pattern. However, the control complexity for the Clos network is high. Some of the hardware controllers for the Clos network have the complexity comparable to that of the switching fabric itself.

Rearrangeable non-blocking networks such as the Benes network uses minimal switching elements with $O(N \log N)$ hardware complexity for a network of size N, but require expensive control algorithms to rearrange the switching elements in an attempt to maintain the non-blocking property. The looping algorithm which rearranges switches in the Benes network operates with $O(N \log N)$ complexity.

The crossbar switch is an example of a wide-sense non-blocking network. With the aid of a simple control algorithm, crossbar switches can be non-blocking. However, the hardware requirement for crossbar switches is expensive—$N^2$ cross-points (N×N) crossbar switch.

Strictly non-blocking switching networks such as the 3-stage Clos network requires less hardware ($O(N^{3/2})$ cross-points) compared to crossbar switches, especially for large N. However, similar to the Benes network, a non-trivial control algorithm is needed to determine the non-blocking routes in the Clos network.

A need exists for a new class of self-routing, packet switched permutation networks. A need exists for a class of rearrangeable non-blocking networks having topologies with minimal hardware cost and optimal control algorithms.

SUMMARY OF INVENTION

The permutation networks of the present invention based on de Bruijn digraphs (i.e., referred to as nD-dBPN where nD=the number n of dimensions D and dBPN is an acronym for "de Bruijn Permutation Network") solves these needs. The 2D-dBPN de Bruijn digraph has a cross-point complexity comparable to that of the 3-stage Clos network (i.e., $O(N \log_d N)$ but without the complex control algorithm required by the Clos networks). A new class of networks is now set forth exhibiting constant control complexity (wide sense non-blocking) having a constant control complexity (self-routing). The cost in terms of the cross-points used for the new network is an optimal $O(N \log N)$. This new self-routing non-blocking network uses fast algorithms to control in the Terabit bandwidth while providing for cost-effective switching.

In addition to having a superior cross-point complexity and a constant control complexity, the new non-blocking network of the present invention also possesses other favorable design properties. The new network also has expandable (i.e., scalable) architecture, i.e., the network can be built by interconnecting smaller non-blocking networks (e.g., small crossbars).

DETAILED DESCRIPTION OF THE INVENTION

1. Overview of Conventional de Bruijn Digraphs.

A conventional de Bruijn digraph, dB(d,n), where dB is an acronym for a de Bruijn digraph which has $d^n$ nodes and $d^{n+1}$ directed edges. N. G. de Bruijn, "A Combinatorial Problem," Proc. Akademe Van Weteschappen, vol. 49, part 2, pp. 758–764, 1946. The address for each node is represented as a sequence of n digits from the d-ary number system. Each node has d outgoing edges and d incoming edges, and the network diameter is n. Node $u=(U_0, U_2, \ldots, U_{n-1})$ has a directed edge to node $v=(v_0, v_2, \ldots v_{n-1})$ if and only if $v_i=u_{i+1}$, for $0<i<n-2$.

Figure 1A:
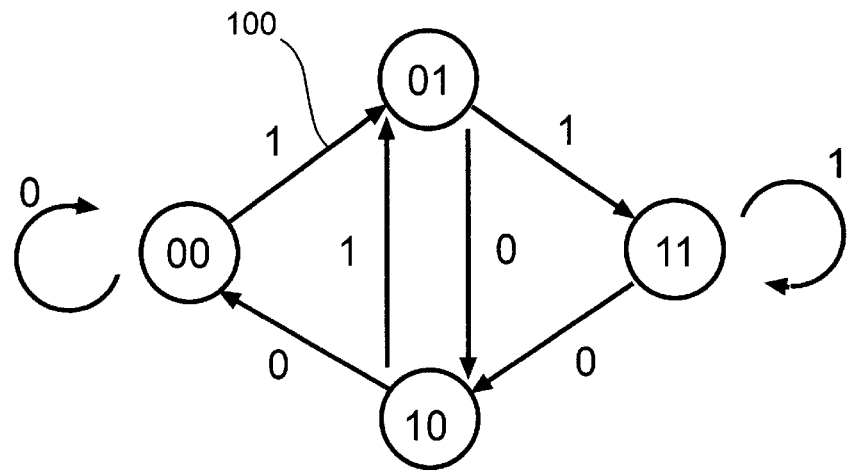
FIG. 1(a) is a prior art de Bruijn Digraph for dB(2,2).
Figure 1B:
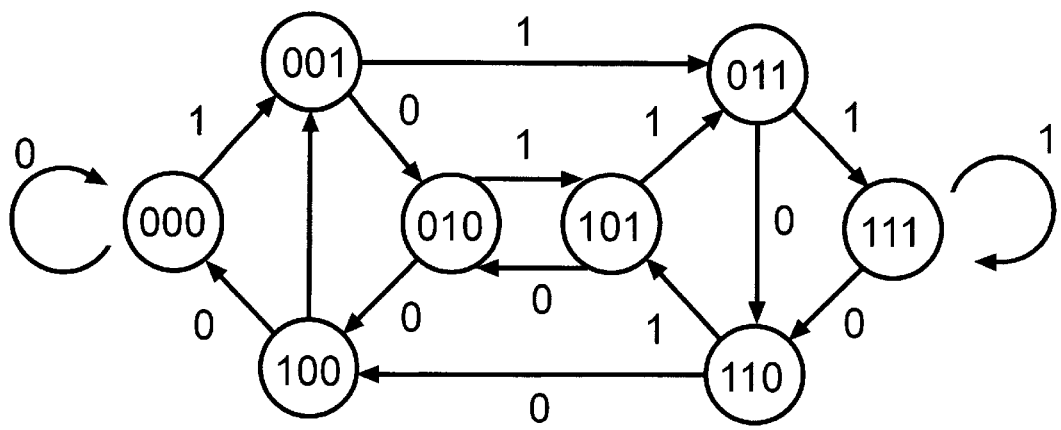
FIG. 1(b) is a prior art de Bruijn Digraph for dB(2,3).

FIGS. 1(a) and 1(b) show conventional dB(2,2) and dB(2,3) digraphs, respectively. A directed edge 100 is identified by the least significant digit of the destination node address. The routing in de Bruijn digraphs is simple, and is based on the destination address. For example, the routing path from source node 00 to destination node 11 in dB(2,2) of FIG. 1(a) is $$00 \xrightarrow{1} 01 \xrightarrow{1} 11.$$

In FIG. 1(b), the routing path from source node 000 to destination node 111 is:

$$000 \xrightarrow{1} 001 \xrightarrow{1} 011 \xrightarrow{1} 111.$$

For a large network such as dB(5,4), not shown, the routing path from source node 2043 to destination node 0123 is $$2043 \xrightarrow{0} 0430 \xrightarrow{1} 4301 \xrightarrow{2} 3012 \xrightarrow{3} 0123.$$

The above represents conventional knowledge of de Bruijn digraphs.

2. 1D-dBPN and 2D-dBPN de Bruijn Digraphs.

The application of such conventional de Bruijn digraphs to network switching occurs in the following.

a. Non-Blocking Property of dB(d,2) as a Permutation Network. The de Bruijn digraphs were originally proposed as multi-hop networks where each of $d^2$ nodes sends and receives arbitrary packets. K. Sivarajan and R. Ramaswami, "Multihop Lightwave Networks Based on de Bruijn Graphs," Proc. IN-FOCOM'91, pp. 1001–1011, Apr. 1991.

The present invention uses de Bruijn digraphs for the design of a permutation network, which are essential for switching/routing in multiprocessors and telecommunications.

When dB(d,2) is used as a permutation network, $d^2$ nodes send $d^2$ packets whose destinations form a permutation of (0, 1, . . . ., $d^2-1$). These packets are generated synchronously during a network cycle with one packet generated per node. The following theorem of the present invention proves that dB(d,2) as a synchronous permutation network performs a permutation in two network cycles.

Theorem 1: A synchronous permutation network dB(d,2) is non-blocking with two network cycles.

Proof: Based on the routing path generated by the routing algorithm in the previous section, each packet in dB(d,2) traverses exactly two directed edges before reaching its destination node. In the first cycle, each packet has d directed edges to choose from, and therefore, the first cycle is conflict-free. In the second cycle, each node might receive up to d packets. However, each of these packets chooses a distinct directed edge, since in the second cycle each packet is routed to its destination node which is distinct.

Figure 2A:
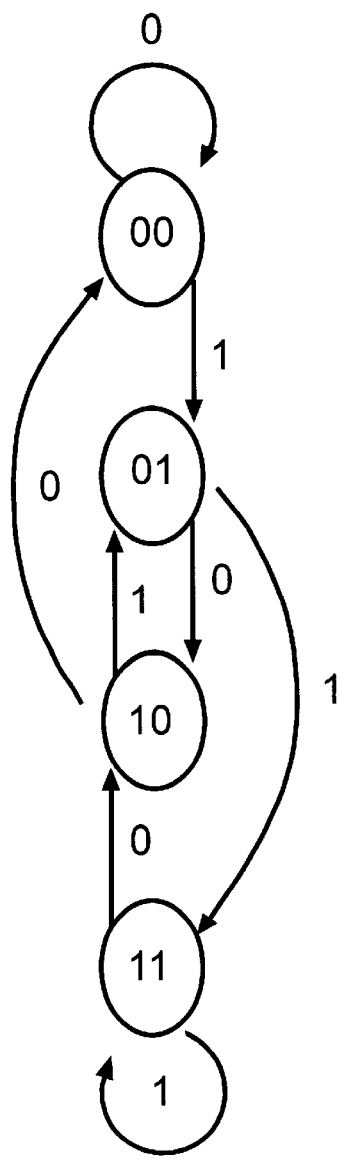
FIG. 2(a) is prior art FIG. 1(a) redrawn with nodes in a column.
Figure 3:
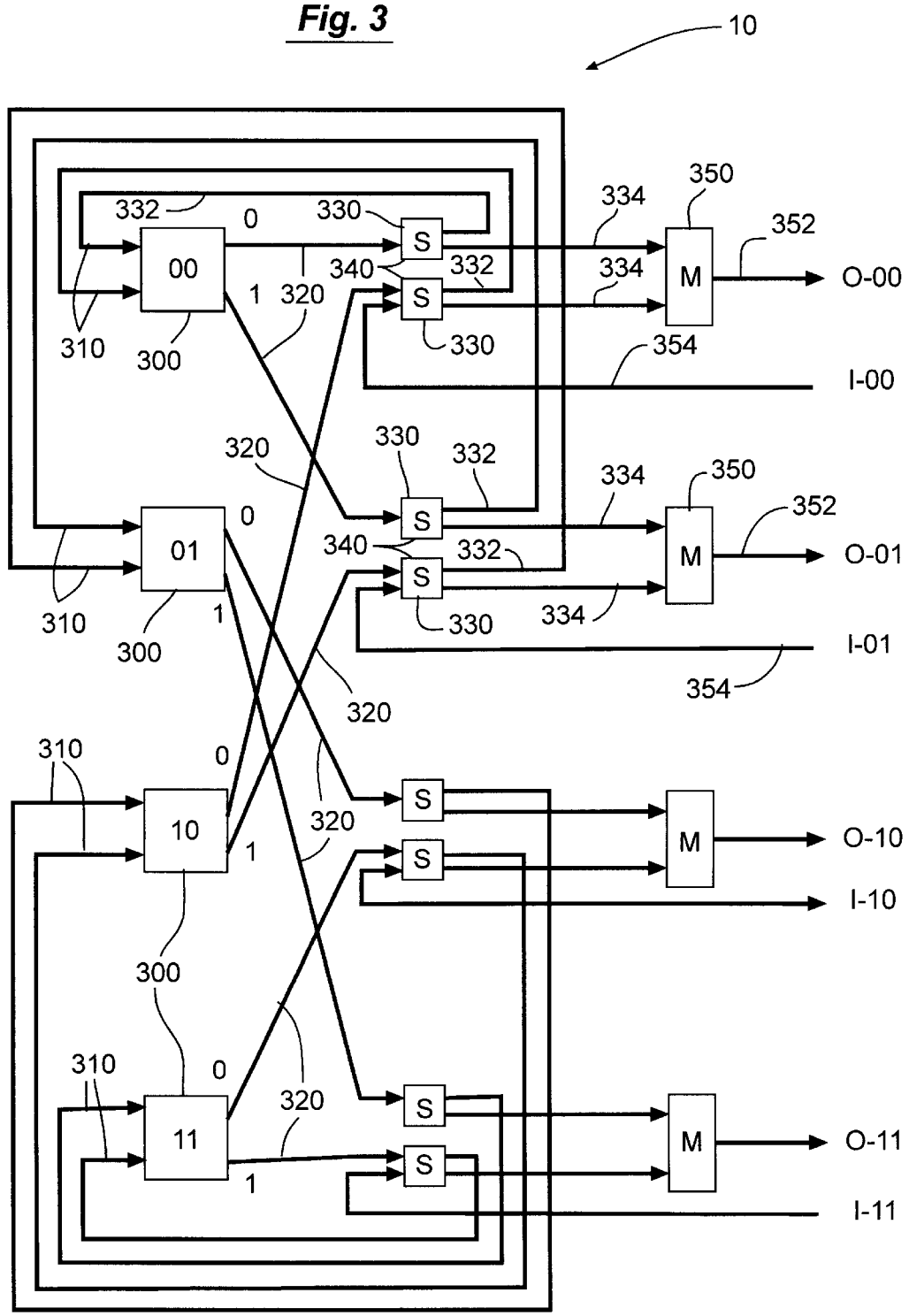
FIG. 3 is a (4×4) 1D-dBPN(d) de Bruijn digraph, where d=2.

The dB(2,2) digraph of FIG. 1(a) is redrawn with nodes in a column in FIG. 2(a). The two network cycles required to perform a permutation on dB(2,2) are represented as two additional columns (i.e., cycle 1 and cycle 2) in dashed lines in FIG. 2(b). This is illustrated in Table I for FIG. 2(b).

b. (N×N) 1D-dBPN(d), $N=d^2$ Single Stage de Brulin Permutation Network. The ($d^2 \times d^2$) 1D-BPN(d) of the present invention is a single-stage network 10 consisting of $d^2$ crossbar switches of size (d×d), labeled corresponding to the $d^2$ nodes in dB(d,2). FIG. 3 shows a (4×4) 1D-dBPN(2). Each crossbar switch 300 has d input 310 and d output 320 links, which are used to connect the crossbar switches 300 in dB(d,2). The output links 320 are labeled corresponding to the least significant digit of the destination address of the crossbar switches. Each output link 320 of a crossbar switch 300 is connected to a (2×2) switch 330 (also referred to as "S"), which provides two paths for a data packet arriving at its input link: one path 332 for routing and the other path 334 for leaving the network 10 when the data packet reaches its destination. The d network output links 334 of each group 340 of d (2×2) switches 330 are connected to a (d×1) multiplexer 350 (also referred to as "M") whose output link 352 is a network output (i.e., 0-XX). Each group 340 of d (2×2) switches 330 also has a network input link 354 (i.e., I-XX).

Figure 2B:
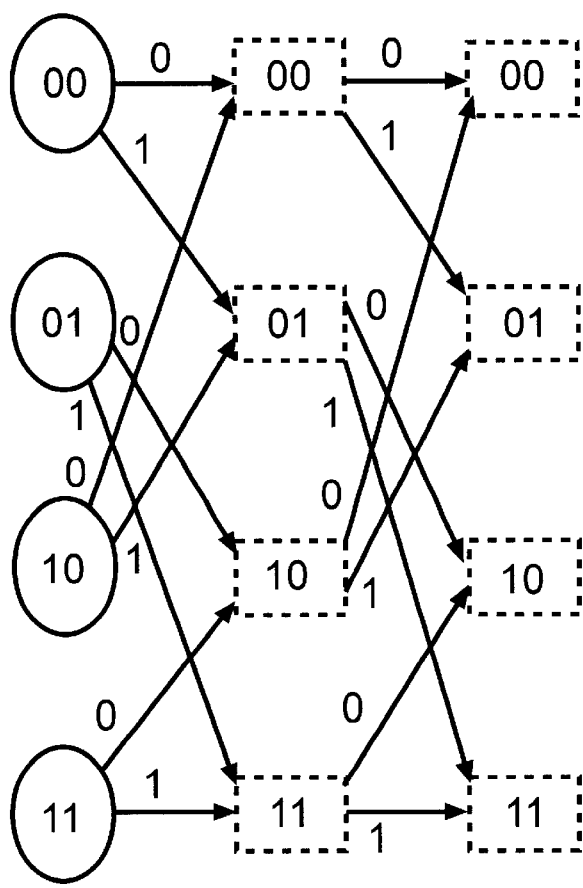
FIG. 2(b) is a permutation performed in two network cycles represented by two additional columns of FIG. 2(a).

The packets within a 1D-dBPN(d) of the present invention shown in FIG. 3 are required to cycle the network exactly twice to reach their destinations as also shown in FIG. 2(b). A packet is injected at a network input link 354 of a (2×2) switch 330. Each (d×d) crossbar switch 300 is connected to d (2×2) switches 330 whose d upper output links 332 connect the crossbar switches 300 in dB(d,2).

By setting a (2×2) switch 370 with a network input link "cross," a data packet is injected into the network over input 354. While in the network 10, a data packet is routed by the crossbar switches 300 together with the (2×2) switches 330. Whenever a data packet needs to be routed in the network 10, the corresponding (2×2) switch 330 is set "straight." When a data packet reaches its destination, the corresponding (2×2) switch 330 is set "cross" so that the data packet can be delivered over output link 352 out of the network 10. Since there are d (2×2) switches 330 for every network output link, a (d×1) multiplexer 350 is needed for each network output link. Note that only one data packet may exit from each group of d (2×2) switches 330 every two network cycles. It is conventional and well known how to control network operation with synchronous clocks.

An algorithm to determine the routing tag for a 1D-dBPN (d) permutation network of the present invention is given in the following. The algorithm is similar to the routing algorithm of dB(d,2) discussed earlier. However, a separate routing tag is needed for the (2×2) switches. A tag bit "0" for a (2×2) switch represents a "straight" setting, and a tag bit "1" represents a "cross" setting. The routing tag for the (2×2) switches is always "101" for 1D-dBPN(d).

Routing Tag Algorithm for 1D-dBPN(d):

Let $S=s_0s_1$: source node address, $D=d_0d_1$: destination node address, $P^{cr}$: crossbar routing tag from S to D, and $P^{sw}$: (2×2) routing tag from S to D. $P^{cr}$: $d_0d_1$;

$P^{sw}$: 101./* '1' for cross, '0' for straight */ where: "P" represents "path," "cr" represents "crossbar," and "sw" represents "switch."

An important characteristic of non-blocking networks is the network depth, defined as the number of cross-points along the longest path between the source node and destination node. The depth for (d×d) crossbar switches 300 is 2d−1. If we use a (2×2) crossbar switch for the (2×2) switch 330, and assume that a (d×1) multiplexer 350 has d cross-points, then the network depth for the permutation network 1D-dBPN(d) of the present invention is:

$$((2\times2)\ \text{switch}) + (2\ \text{internal cycles}) + (MUX) = (3) + (2(2d-1+3)) + (d) = 5d+7 \qquad \text{EQUATION 1}$$

(When d=2 in FIG. 3, the network depth is 17 cross-points.)

Figure 4:
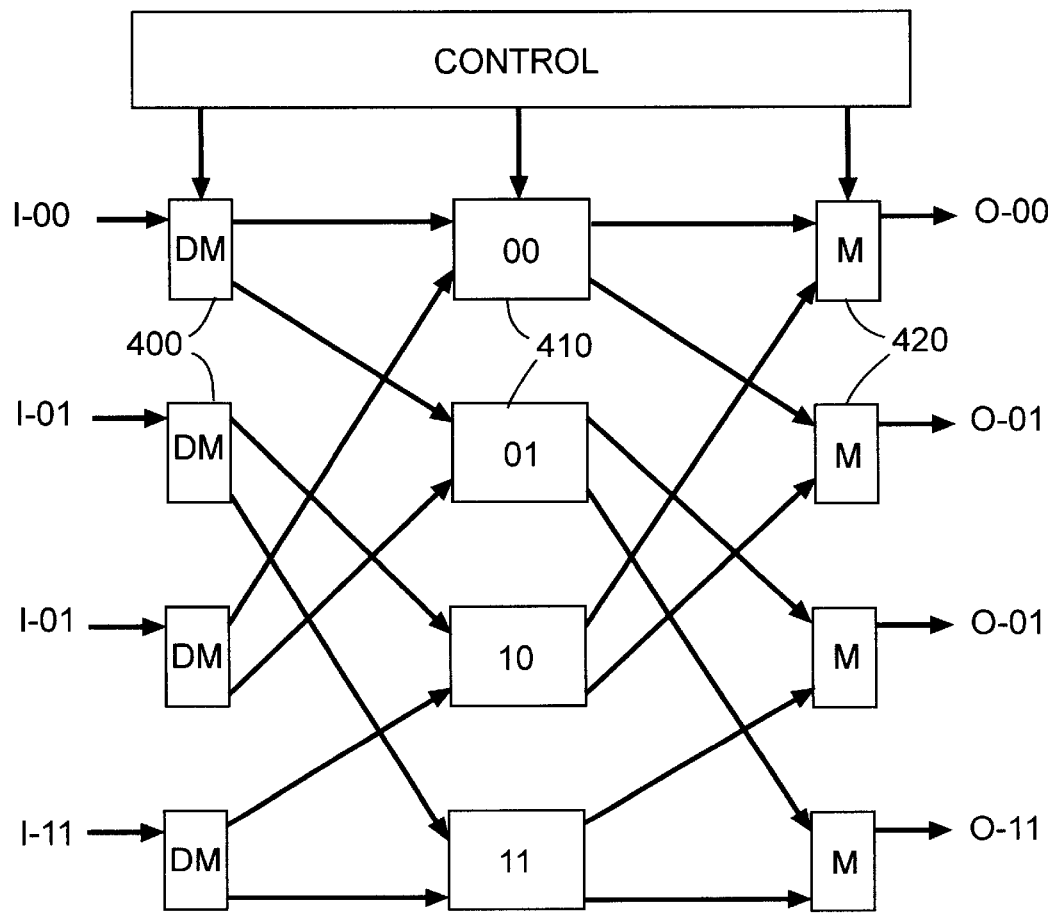
FIG. 4 is a (4×4) pipelined 1D-dBPN(d) de Bruijn digraph, where d=2.
Figure 5:
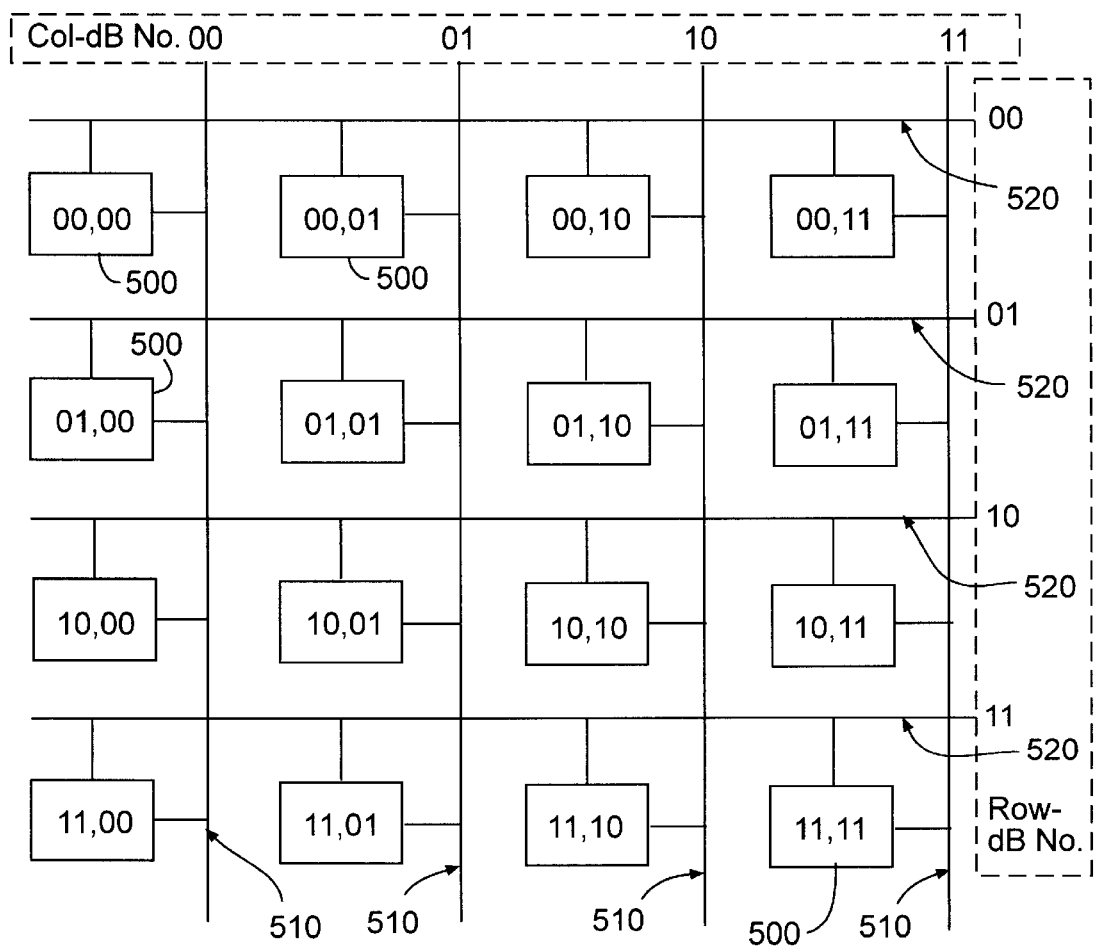
FIG. 5 is a (16×16) 2D-dBPN(2) de Bruijn digraph formed as a two-dimensional dB(2,2)'s.

C. Pipelined 1D-dBPN(d), $N=d^2$ de Bruijn Permutation Network. A pipelined 1D-dBPN(d) of the present invention uses a stage of (1×d) demultiplexers (DM) 400, followed by a stage of (d×d) crossbar switches 410 and a stage of (d×1) multiplexers (M) 420 as shown in FIG. 4. Three different sets of data packets (i.e., one at each stage) occupy the pipelined 1D-dBPN(d) at any given time. It requires $d^4+2d^3$ cross-points. It requires:

$d^2$ rows of (1×d) DeMux, (d×d) crossbar, (d×1) mux=$d^2$ ($d+d^2+d$)=$d^4+2d^3$ cross-points For d=2 this results in 32 cross-points.

d. (N×N) 2DdBPN (d), $N=(d^2)^2$ de Bruijn Permutation Network. The ($d^4 \times d^4$) 2D-dBPN(d) of the present invention consists of two ($d^2 \times d^2$) square arrays of (d×d) crossbar switches 500. The crossbar switches in each column/row are connected as a dB(d,2): col-dB(d,2) 510 or row-dB(d,2) 520. A (16×16) 2D-dBPN(2) is shown in FIG. 5. Each crossbar switch 500 is connected to a col-dB(d,2) 510 and a row-dB(d,2) 520, and is labeled as row-dB no., col-dB no. in the d-ary number system.

Figure 6:
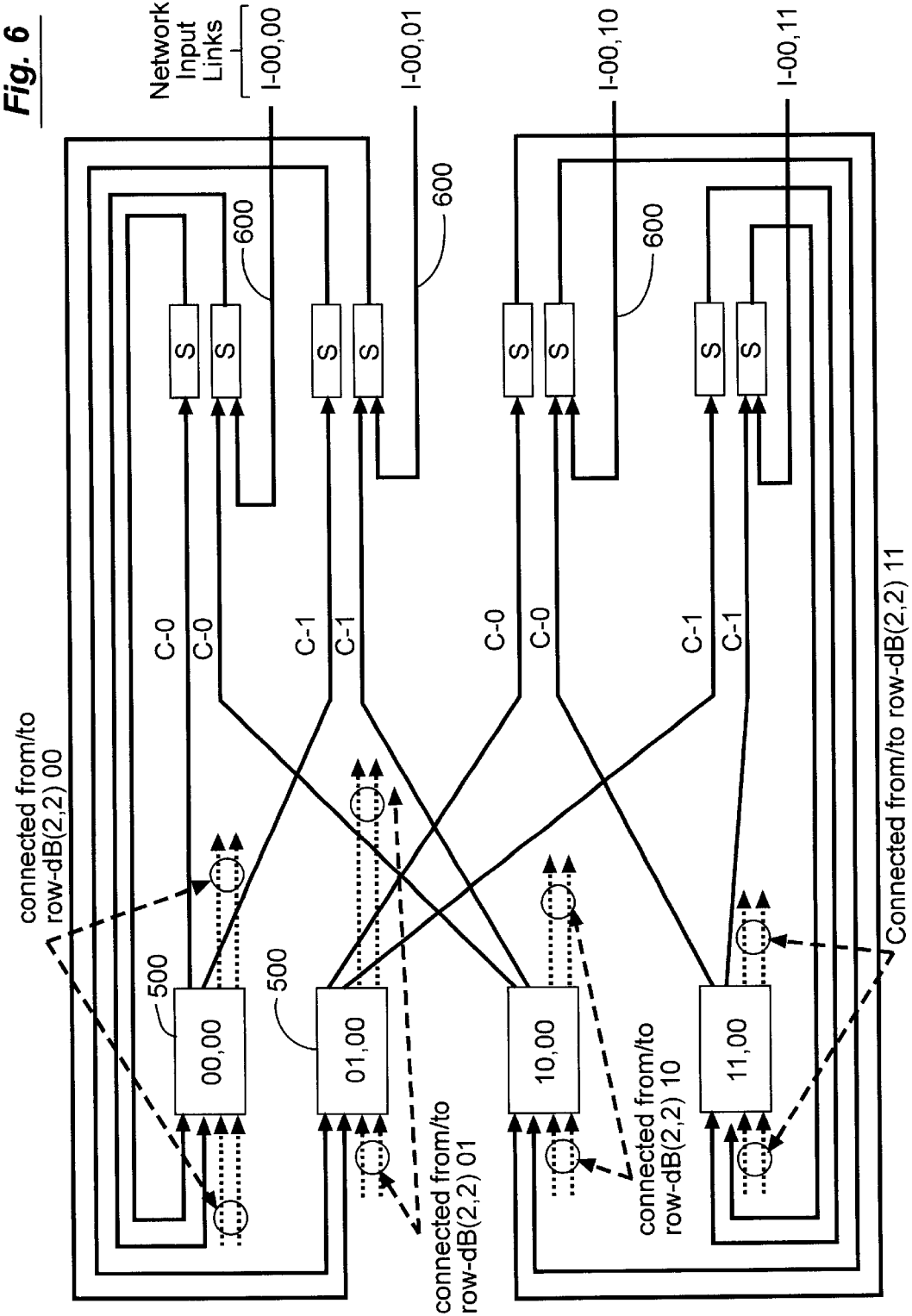
FIG. 6 is the col-dB(d,2)00 of the (16×16) 2D-dBPN(d) de Bruijn digraph, where d=2.
Figure 7:
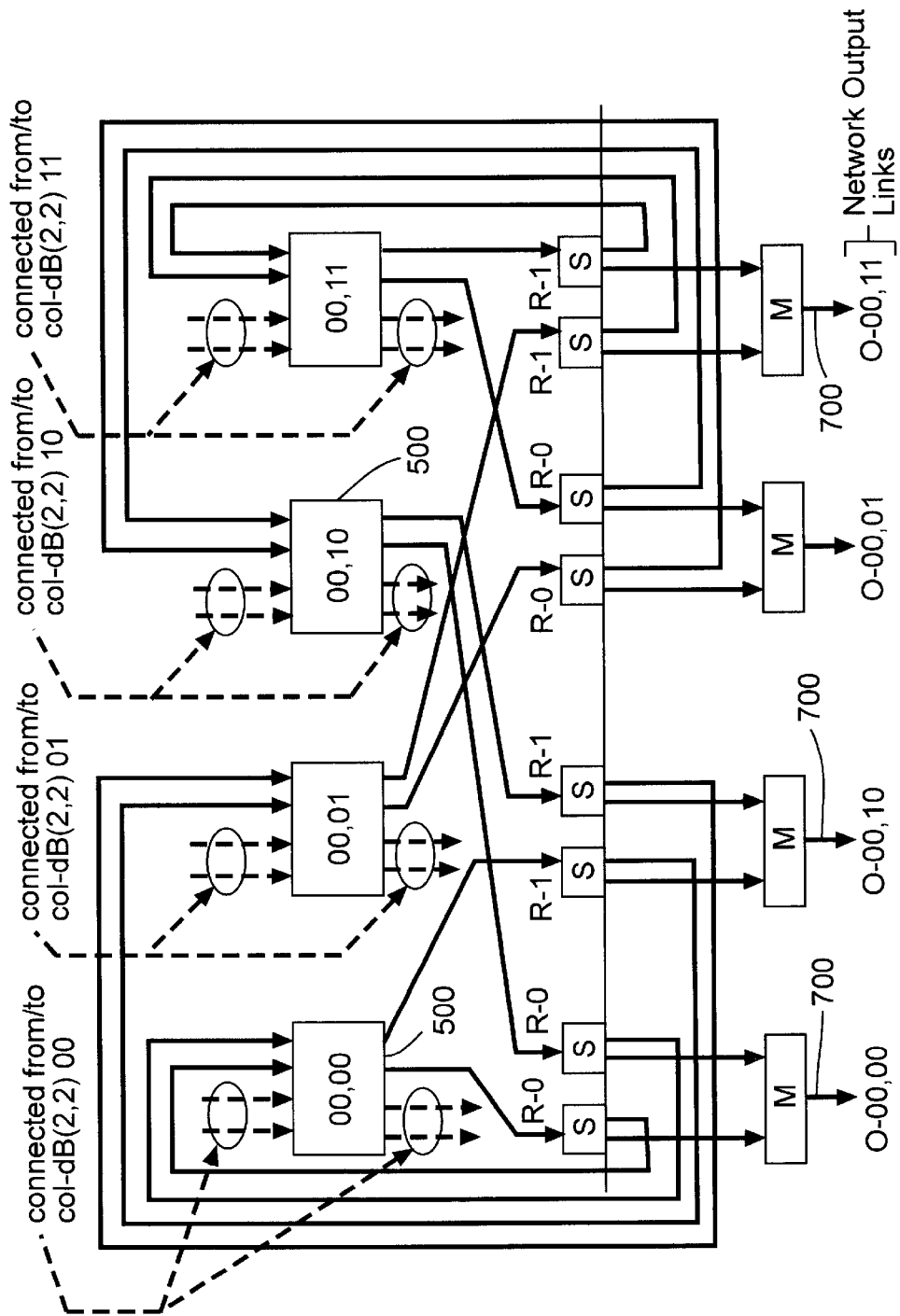
FIG. 7 is row-dB (d,2)00 of the (16×16) 2D-dBPN(d) de Bruijn digraph, where d=2.

FIG. 6 and FIG. 7 show col-dB(2,2) 00 and row-dB(2,2) 00 of a (16×16) 2D-dBPN(2), respectively, corresponding to FIG. 5. The output links of the (d×d) crossbar switches 500 are prefixed with either 'R' for row or 'C' for column connections. The network input links 600 to the 2D-dBPN (d) permutation network of the present invention are connected to col-dB(d,2)'s, and are labeled as 'I-row-dB no., col-dB no.' in FIG. 6. The network output links 700 from 2D-dBPN(d) are connected from row-dB(d,2)'s, and are labeled as 'O-row-dB no., col-dB no.' in FIG. 7.

The routing algorithm for the 2D-dBPN(d) permutation network consists of two phases: one to send a packet to its destination row 520 and the other to send a packet to its destination column 510. The row or column routing is simply the 1D-dBPN(d) routing. Each 1D-dBPN(d) requires two network cycles for routing. To simplify the following discussion, one 1D-dB-network cycle is defined as the two network cycles required by the 1D-dBPN(d).

Pseudo routing algorithm for ($d^4 \times d^4$) 2D-dBPN(d):
1. For i←(1 to $d^2$−1)do /* During, time-slot i, all packets i rows away from their destination rows are routed to their final destinations */
2. If [((src-row+i) mod $d^2$)=dest-row]
3. route data to (dest-row, src-col) via col-dB(d,2) of src-col;
4. route data to (dest-row, dest-col) via row-dB(d,2) of dest-row;
5. else
6. idle for 2 1D-dB-network cycles. /* 1 1D-dB-network cycle of col-dB(d,2) and 1 1D-dB-network cycle of row-dB(d,2).*/

During time-slot i, data packets i rows away from their destination rows move to the destination rows in every column. These moves of data packets within a column are a uniform shift of distance i and can be realized in 1D-dB-network cycle of col-dB(d,2) networks. Data packets move to a new row 520 only if the new row 520 is the destination row 520. After all these data packets from each column reach their destination rows, the data packets are moved within each row 520 to their destination columns 510 in another 1D-dB-network cycle. The data movements in a row are conflict-free since the destination columns are a permutation. Since there are $d^2$−1 time-slots, the time used for routing in 2D-dBPN(d) is 2($d^2$−1) 1D-dB-network cycles.

Assuming that the delay is proportional to the cross-points visited, the worst-case delay for 2D-dBPN(d) is $2d^2$ (5d+7)=$O(d^3)$, while the worst-case delay for a conventional crossbar switch of the same size is 2($d^4$−1)=$O(d^4)$.

Routing Tag Algorithm for ($d^4 \times d^4$) 2D-dBPN(d)

Let (Sr,Sc)=($sr_0sr_1,sc_0sc_1$): src address, (Dr,Dc)=($dr_0dr_1, dc_0dc_1$): dest address, /* 2 digit row/col address for 2-hop 1D-dB-network*/

$P^{cr}$: crossbar routing tag from (Sr,Sc) to (Dr,Dc), and $P^{sw}$: (2×2) routing tag from (Sr,Sc) to (Dr,Dc).

/* Each packet waits for time-slot $D_r$–$D_s$. Subscripts indicate the number-system used. */ RowDistance$_{10}$= ($Dr_d$–$Sr_d$) mod $d^2$;

Wait for (2×[RowDistance$_{10}$−1]) time-slots;

/* Routing tag for (2×2) switches in each col-dB or row-dB is always 1001. */ $P^{sw}$=10011001;

/* Column routing to $D_r$ via the crossbar switch output links C–$dc_0$ and C–$dc_1$.

Row routing to $D_c$ via the crossbar switch output links R–$dr_0$ and R–$dr_1$. */ $P^{cr}$=(C–$dc_0$, C–$dc_1$, R–$dr_0$, R–$dr_1$).

For example, if the source address is (00,00) and the destination address is (11,11), then the routing path is

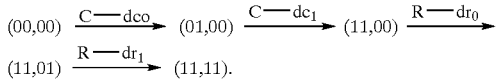

Since the RowDistance=$(11_2-00_2)=11_2=3_{10}$, the packet from (00,00) is routed after a two time-slot delay.

e. Cross-Points Used By the 2D-dBPN(d). As can be seen in FIGS. 6 and 7, there are three different kinds of switching components in ($d^4 \times d^4$) 2D-dBPN(d): ($d \times d$) crossbar switches 500, (2×2) switches S, and ($d \times 1$) multiplexers M. The number of cross-points required for these switches are $d^2$, 4, and d, respectively. Summing up all the cross-points required, the number of cross-points used in (N×N) 2D-dBPN(d), N=$d^4$:

(col and row arrays)×(network size)×$(d^2+4d+d)=2(d^4)(d^2+5d)=$
$2d^6+10d^5$  EQUATION 2

Thus, the (N×N) 2D-dBPN(d), N=$d^4$, uses $2N^{3/2}+10N^{5/4}=O(N^{3/2})$ cross-points. Table 1 shows the numbers of cross-points used by the (N×N) 2D-dBPN(d) in comparison to conventional (N×N) crossbar switches.

TABLE 1

Cross-points used for (N × N) 2D-dBPN(d) and crossbar switches

| Size | 2D-DBPN(d) Cross-points Used | (N × N) Crossbar Switches |
|---|---|---|
| d = 2, N = 16 | 448 | 256 |
| d = 3, N = 81 | 3,888 | 6,561 |
| d = 4, N = 256 | 18,432 | 65,536 |
| d = 5, N = 625 | 62,500 | 390,625 |
| d = 10, N = 10,000 | 3,000,000 | 100,000,000 |

Table 2 compares the 2D-dBPN(d) permutation network of the present invention with conventional crossbar switches, Clos networks, and Benes networks.

TABLE 2

Comparison of Different Permutation Networks

| Networks | Cross-points | Control Complexity | Network Depth |
|---|---|---|---|
| 2D-dBPNs | $2N^{3/2}+10N^{5/4}$ | O(1) | $O(N^{1/4})$ |
| Crossbar Switches | $N^2$ | O(1) | O(N) |
| 3-Stage Clos | $6N^{3/2}-3N$ | $O(N^{3/2})$ | $O(N^{1/2})$ |
| Benes | $2N(2(\log_2 N)-1)*$ | $O(N \log N)**$ | $O(\log N)$ |

*Assuming 2 × 2 crossbar switches.
**Looping algorithm.

f. Depth of a 2D-dBPN(d) de Bruijn Network.
The network depth for a (N×N) 2D-dBPN(d), N=$d^4$ permutation network of the present invention, can be calculated as follows:

The network depth of 2D-dBPN(d)

=2 (depth of col/row network)

=2(5d+7)

=$O(N^{1/4})$  EQUATION 3

Note that, since the 2D-dBPN(d) permutation network employs time multiplexing in the first dimension, the network delays for 2D-dBPN(d) is higher than the network depth. The network delays in terms of cross-point delays for 2D-dBPN(d) is $O(N^{3/4})$ as shown below:

=$(d^2-1)\times(2(1D\text{-}dBPN(d)))$

=$(d^2-1)(2(5d+7))$

=$10d^3+14d^2-10d-14$

=$10N^{3/4}+14N^{1/2}-10N^{1/4}-14$

=$O(N^{3/4})$  EQUATION 4

3. Variations of a 2D-dBPN(d) de Brulin Networks Several variations of the 2D-dBPN(d) de Bruijn network of the present invention are presented next.

a. (N×N) 2D-dBPN($d_r,d_c$), N=$d^2_r d^2_c$

While the 2D-dBPN(d) permutation network of the present invention is based on two square arrays of ($d \times d$) crossbar switches, the (N×N) 2D-dBPN($d_r,d_c$), N=$d^2_r d^2_c$, not shown, is based on two ($d^2_r, d^2_c$) rectangular arrays of crossbar switches. The rectangular array of col-dB(d,2)'s consists of ($d_c \times d_r$) crossbar switches and the rectangular array of row-dB(d,2)'s consists of ($d_r \times d_r$) crossbar switches.

The routing algorithm for 2D-dBPN($d_r,d_c$) is the same as the routing algorithm for 2D-dBPN(d). The only difference is that the col-dB and row-dB network cycles may be different for 2D-dBPN($d_r,d_c$). Based on the algorithm, it is more efficient if $d_c<d_r$ since regardless of $d_r$, all packets in a row can be routed in one 1D-dB-network cycle of row-dB(d,2) networks. However, 2D-dBPN($d_r,d_c$) is hardware efficient when $d_r=d_c$, i.e., when it reverts to 2D-dBPN(d). Table 3 shows examples of extra network sizes available in 2D-dBPN($d_r,d_c$).

TABLE 3

Network Sizes Available for 2D-dBPN($d_r$, $d_c$).

| $d_c$ | $d_r$ | (N × N) 2D-dBPN($d_r$, $d_c$) input/output size |
|---|---|---|
| 4 | 4 | 256 |
| 4 | 5 | 400 |
| 4 | 6 | 576 |
| 5 | 5 | 625 |

The network delay, including the buffering time for 2D-dBPN($d_r,d_c$), is $(d^2_c)((5d_c+7)+(5d_r+7))$ cross-point delays. The number of cross-points used in 2D-dBPN($d_r,d_c$) is $(d^2_c d^2_r)((d^2_c+5d_c)+(d^2_r+5d_r))$.

b. (N×N) 2D-BdBPN(d), N=$d^4$. Use of conventional Banyan networks for the column networks can improve the 2D-dBPN(d) permutation network of the present invention. Banyan networks are discussed in L. Goke and G. Lipovski, "Banyan networks for partitioning multiprocessor systems," *Proc. of 1st Annual Symp. on Computer Architecture*, pp. 21–28, Dec. 1973. The function of col-dB's of the 2D-dBPN permutation network is a uniform shift. This uniform shift within a column can be handled by a Banyan network without a conflict.

The advantages of using Banyan networks for the column networks of the present invention are twofold: a reduction in the cross-points used and the capability for pipelining. If the pipelining is used in the Banyan networks, then row-dB(d,2)'s should also use pipelining (pipelined 1D-dBPN), so that both column and row networks can be pipelined synchronously.

The (N×N) Banyan networks based on (2×2) switching elements have ($\log_2 N$) stages, with each stage consisting of N/2, (2×2) switching elements. The Banyan networks are bit-controlled with the destination address.

Figure 8:
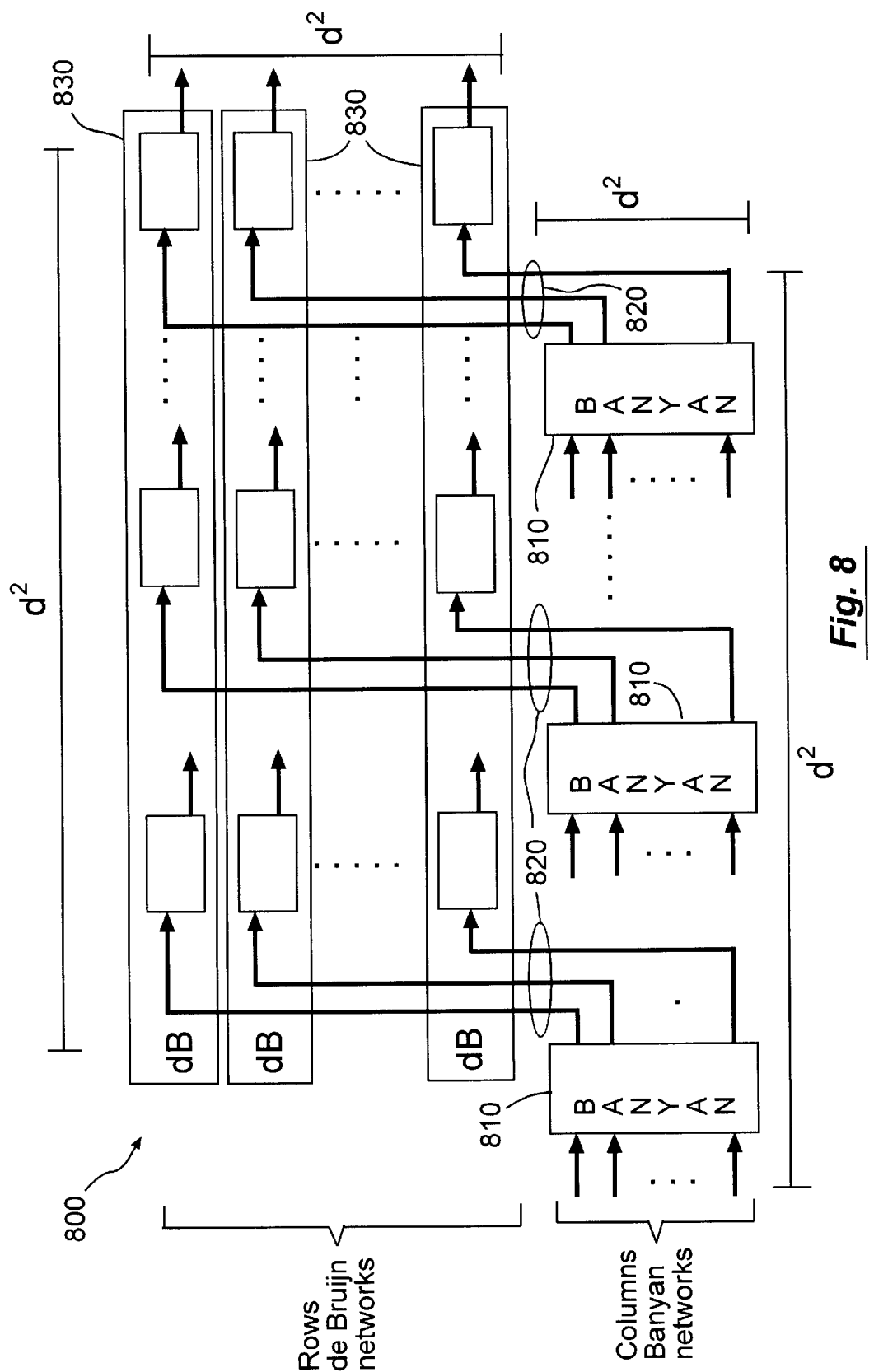
FIG. 8 is an (N×N) 2D-BdBPN(d) de Bruijn digraph, where $N=d^4$.

The ($d^4 \times d^4$) 2D-BdBPN(d) network 800 of the present invention is shown in FIG. 8. Here, the term "BdBPN" means "Banyan, de Bruijn Permutation Network." Each column network 810 is a ($d^2 \times d^2$) Banyan network. The outputs 820 from these Banyan networks are directed to the de Bruijn row-networks 830. Within a de Bruijn network 830, data are routed without a conflict since the destination addresses of the data within a row are a permutation.

Routing Tag Algorithm for 2D-BdBPN(d)

Let (Sr,Sc)=($sr_0 sr_1$, $sc_0 sc_1$): src address,
(Dr,Dc)=($dr_0 dr_1$, $dc_0 dc_1$): dest address,
$P^B$: routing tag used by Banyan networks,
$P^{dBcr}$: crossbar routing tag used by row-dB(d,2)'s, and
$P^{dBsw}$: (2×2) routing tag used by row-dB(d,2)'s.
RowDist$_{10}$=($Dr_d - Sr_d$) mod $d^2$;
wait ($3(\log_2 d^2) \times$ RowDist$_{10}$) cross-point delays;
$P^B = (DC)_{base2}$;
$P^{dBcr}$=Dr and $P^{dBsw}$=101.

More choices of network sizes can also be obtained by using different network degrees for column and row networks, similar to 2D-dBPN($d_r$,$d_c$). The number of cross-points used in 2D-BdBPN(d) of FIG. 8 are:

(Cross-points in Banyan networks 810)+(Cross-points in deBruijn networks 830)

$$= \left((d^2)\left(\frac{4d_2}{2}\log_2 d2\right)\right) + ((d^4)(d^2+5d)) \quad \text{EQUATION 5}$$
$$= d^4(4(\log_2 d) + d^2 + 5d)$$

The network depth of 2D-BdBPN(d) of FIG. 8 is better than the network depth of the 2D-dBPN(d). This is because the depth of the de Bruijn row-networks 830 in 2D-dBPN(d), 5d+7, is replaced by the depth of the Banyan networks 810, $2(\log_2 d)$, in 2D-BdBPN(d). The 2D-BdBPN(d) of FIG. 8 has a better delay than the same size conventional crossbar switch: $O(d^3)$ versus $O(d^4)$. Note that the amortized delay for 2D-BdBPN(d) can be improved if pipelining is used.

$$= (\text{Number of rows}) \times \quad \text{EQUATION 6}$$
$$((\text{Banyan network delay}) +$$
$$(\text{de Bruijn network delay}))$$
$$= d^2(3(\log_2 d^2) + (5d+7))$$
$$= 6d^2(\log_2 d) + 5d^3 + 7d^2$$

4. n-Dimensional dBPN: nD-dBPN(d).

The n-dimensional dBPN(d) can be constructed similar to the construction of 2D-dBPN(d). There are N=$(d^2)^n$ input/output nodes in the nD-dBPN. In 3D-dBPN(d), the first-dimension networks and the second-dimension networks are the column networks and the row networks of 2D-dBPN(d), respectively. In 3D-dBPN(d), the outputs from the second-dimension networks are routed to the inputs of the third-dimension networks. The process can be repeated for the n dimensional dBPN, n>3.

The number of cross-points used in nD-dBPN(d) network of the present invention is shown in Equation 7. Table 4 shows examples of various nD-dBPN(d) for network size N=$2^{64}$ and their corresponding cross-point requirements.

TABLE 4

Cross-points Used for ($2^{64} \times 2^{64}$), $2 \leq n \leq 16$.

| Network Size (N = $2^{64}$) | Cross-points Used | Network Delays |
|---|---|---|
| 2D-dBPN(d = $2^{16}$) | $1.58 \times 10^{29}$ | $2.81 \times 10^{15}$ |
| 4D-dBPN(d = $2^{8}$) | $4.93 \times 10^{24}$ | $1.45 \times 10^{18}$ |
| 8D-dBPN(d = $2^{4}$) | $4.96 \times 10^{22}$ | $5.02 \times 10^{19}$ |
| 16D-dBPN(d = $2^{2}$) | $1.06 \times 10^{22}$ | $4.98 \times 10^{20}$ |
| Crossbar Switches | $3.40 \times 10^{38}$ | $3.69 \times 10^{19}$ |
| 3-Stage Clos Networks | $4.76 \times 10^{29}$ | $4.29 \times 10^{10}$ |

In terms of hardware, the table implies that for a given network size, it is better to choose a big n and a small d.

Number of cross-points used in nD-dBPN(d)=(no. of dimensions)×(network size)×($d^2+5d$)=nd$^{2n}$($d^2+5d$)

$$= n(N^{1/2n})^{2n}((N^{1/2n})^2 + 5(N^{1/2n}))$$

$$= nN(N^{1/n} + 5N^{1/2n})$$

$$= n(N^{n+1/n} + 5N^{n+1/2n}) \quad \text{EQUATION 7}$$

If we choose n such that n=$\log_m N$, for some integer m, Equation 7 becomes:

$$(\log_m N)(mN = 5(mN)^{1/2}) = O(N \log N). \quad \text{EQUATION 8}$$

Note that for a high n, the range of the variables involved are as follows: (d, n=2, 3, . . . ), (m=$d^2$ . . . $d^{2n}$), (N=$d^{2n}$).

The cross-point delay for nD-dBPN(d) is shown in Equation 9. Table 4 shows the cross-points used and the network delays for the various nD-dBPN(d)'s for the network size of N=$2^{64}$. The table shows that the larger the n is, the longer the delay is.

Cross-point delay for nD-dBPN(d)

$$= ((d^2)n - 1) \times (n \times 1\text{D-}dBN(d))$$

$$= d^{2(n-1)}(n(5d+7))$$

$$= 5nd^{2n-1} + 7nd^{2n-2}$$

$$= 5nN^{(2n-1)/2n} + 7nN^{(2n-2)/2n} \quad \text{EQUATION 9}$$

If we choose n such that n=$\log_m N$, for some integer m, Equation 9 becomes:

$$N/m(\log_m N)(5m^{1/2}+7)$$

$$= O(N \log N). \quad \text{EQUATION 10}$$

Note that the delay shown in Equation 10 includes the buffering time before the data enters the network. The network depth for nD-dBPN(d) is only O(log N), N=$(d^2)^n$ as shown in the following:

Network depth for nD-*dBPN(d)*

$$= (n) \times (\text{depth of each dimension})$$

$$= n \times (5d+7)$$

$$= 5nd + 7n$$

$$= 5nN^{1/2n} + 7n$$

$$= (\log_m N)(5m^{1/2}+7), \text{ for some } m$$

$$= O(\log N) \quad \text{EQUATION 11}$$

5. Summary.

The present invention introduced new permutation networks based on the de Bruijn digraphs. The new permutation networks, nD-dBPN, are self-routing, scalable and have an optimal cross-point complexity. Compared to the crossbar switches of the same size, nD-dBPN uses less cross-points and operates faster. With its optimal configuration, the new network uses O(N log N) cross-points compared to $O(N^2)$ cross-points of the crossbar switches. The 2d-dBPN has the same cross-point complexity as the 3-stage Clos network, but it has a constant control complexity compared to $\Omega(N^{3/2})$ of the Clos network.

The above disclosure sets forth a number of embodiments of the present invention. Those skilled in this art will however appreciate that other arrangements or embodiments, not precisely set forth, could be practiced under the teachings of the present invention and that the scope of this invention should only be limited by the scope of the following claims.

We claim:

1. A network stage comprising:

a first number of cross-bar switches, a second number of a group of switches, each group of switches providing an input to the network stage, a third number of multiplexers, each multiplexer providing an output for the network stage, said cross-bar switches, said switches, and said multiplexers interconnected as an (N×N) one dimensional de Bruijn permutation network single stage network, wherein $N=(d^2)^2$ of a d-ary number system and wherein each crossbar switch has d inputs, and wherein the first number, the second number, and the third number equal $d^2$.

2. The network stage of claim 1 further having data packets at the inputs to the network stage and wherein when d=2, two network cycles move the data packets to the outputs of the network stage.

3. The network stage of claim 2 wherein two switches are in each group.

4. The network stage of claim 3 wherein the network depth is 5d+7.

5. A scalable permutation network comprising:

a plurality of (N×N) 1D-de Bruijn permutation network elements, where $N=(d^2)^2$, and nD=the number n of dimensions D of a d-ary number system, each of said plurality of de Bruijn permutation network elements having a cross-bar switch and an associated set of routing switches, each of said plurality of cross-bar switches having directed edge outputs connected to sets of routing switches of other de Bruijn permutation elements and having directed edge inputs from the sets of routing switches of other de Bruijn permutation elements, one of said directed edge inputs coming from one of the routing switches in said associated set of switches.

6. A pipeline network comprising:

a first stage of demultiplexers, each said demultiplexer having one input and d outputs, a second stage of crossbar switches, each crossbar switch having d inputs and d outputs, a third stage of multiplexers, each said multiplexer having d inputs and one output, said demultiplexers, crossbar switches, and multiplexers interconnected as a pipelined single dimension de Bruijn permutation network of a d-ary number system, said first, second, and third stages each having d data packets.

7. The pipeline network of claim 6 having $d^4+2d^3$ cross-points.

8. A pipelined network comprising:

a first stage having a set number of demultiplexers, a second stage having the set number of crossbar switches, a third stage having the set number of multiplexers, said set number of demultiplexers, crossbar switches, and multiplexers connected as a pipelined nD-dBPN(d) de Bruijn permutation network where nD=the number of dimensions of a d-ary number system so that the set number of data packets occupy each of said first, second, and third stages at any given time.

9. The pipelined network of claim 8 wherein nD=1D and the set number is four.

10. A network comprising:

an array of single dimension networks, each single dimension network having cross-point switches interconnected as an (N×N) nD-de Bruijn permutation network, where $N=d^2$ and nD=the number dimensions of a d-ary number system, each single dimension network having inputs and outputs, data packets, said data packets at the outputs from a lower dimension network self-route synchronously during a single network cycle to inputs of the next higher dimension network.

11. The network of claim 10 wherein the array is square.

12. The network of claim 10 wherein the array is rectangular.

13. The network of claim 10 further having nD=2, a column of cross-point switches and a row of cross-point switches, the outputs from the column cross-point switches are interconnected to the inputs of the row cross-point switches along directed edges of the de Bruijn permutation network.

14. The network of claim 13 further having switches, said switches having internal routing to the de Bruijn permutation network and inputs to the network.

15. The network of claim 14 further having multiplexers, said multiplexers connected to said switches and having outputs from the network.

16. The network of claim 10 wherein for nD=2, the number of cross-points are $2d^6+10d^5$.

17. The network of claim 10 wherein for nD=2, the network depth is 2 (5d+7).

18. A network comprising:

a plurality of row de Bruijn permutation networks, a plurality of column Banyan networks, each output of each column of said plurality of Banyan networks connected to input one of each of the plurality of row de Bruijn permutation networks.

19. The network of claim 18 wherein each of the plurality of row de Bruijn permutation networks is configured from (N×N) 2D-dBPN(d) elements where $N=(d^2)^2$ of a d-ary number system.

* * * * *